United States Patent
Kleen et al.

[11] 3,900,791
[45] Aug. 19, 1975

[54] VOLTAGE TRANSFORMER FOR COMPLETELY INSULATED, METAL-CLAD HIGH-VOLTAGE INSTALLATIONS

[75] Inventors: Gerhard Kleen; Albert Herrmann, both of Berlin, Germany

[73] Assignee: Siemens Aktiengesellschaft, Munich, Germany

[22] Filed: May 17, 1974

[21] Appl. No.: 471,014

[30] Foreign Application Priority Data
May 17, 1973 Germany............................ 2325448

[52] U.S. Cl. .................... 323/93; 307/147; 174/28; 317/244
[51] Int. Cl. ........................ H01f 27/00; H01b 9/00
[58] Field of Search ............ 317/242, 244; 307/147, 307/149; 174/27, 28, 99 R, 99 B; 323/93

[56] References Cited
UNITED STATES PATENTS

| | | | |
|---|---|---|---|
| 1,873,977 | 8/1932 | Naef | 174/DIG. 10 |
| 3,701,944 | 10/1972 | Amalric | 307/147 |
| 3,763,378 | 10/1973 | Muller | 307/149 |
| 3,829,742 | 8/1974 | Muller | 323/93 |
| 3,835,353 | 9/1974 | Hermstein | 317/244 |

*Primary Examiner*—L. T. Hix
*Attorney, Agent, or Firm*—Kenyon & Kenyon Reilly Carr & Chapin

[57] ABSTRACT

A voltage transformer for a completely insulated, metal-clad, high-voltage installation includes an electrode of extended surface area which is arranged inside the metal outer tube of the high-voltage installation. This electrode and the high-voltage conductor of the installation conjointly define the high-potential capacitor of a capacitive voltage divider. The dielectric of the high-potential capacitor is an insulating member which carries the extended-area electrode. The insulating member carries, in addition, the low-potential capacitor of the capacitive voltage divider. An amplifier, followed by a load, is connected to the low-potential capacitor.

10 Claims, 1 Drawing Figure

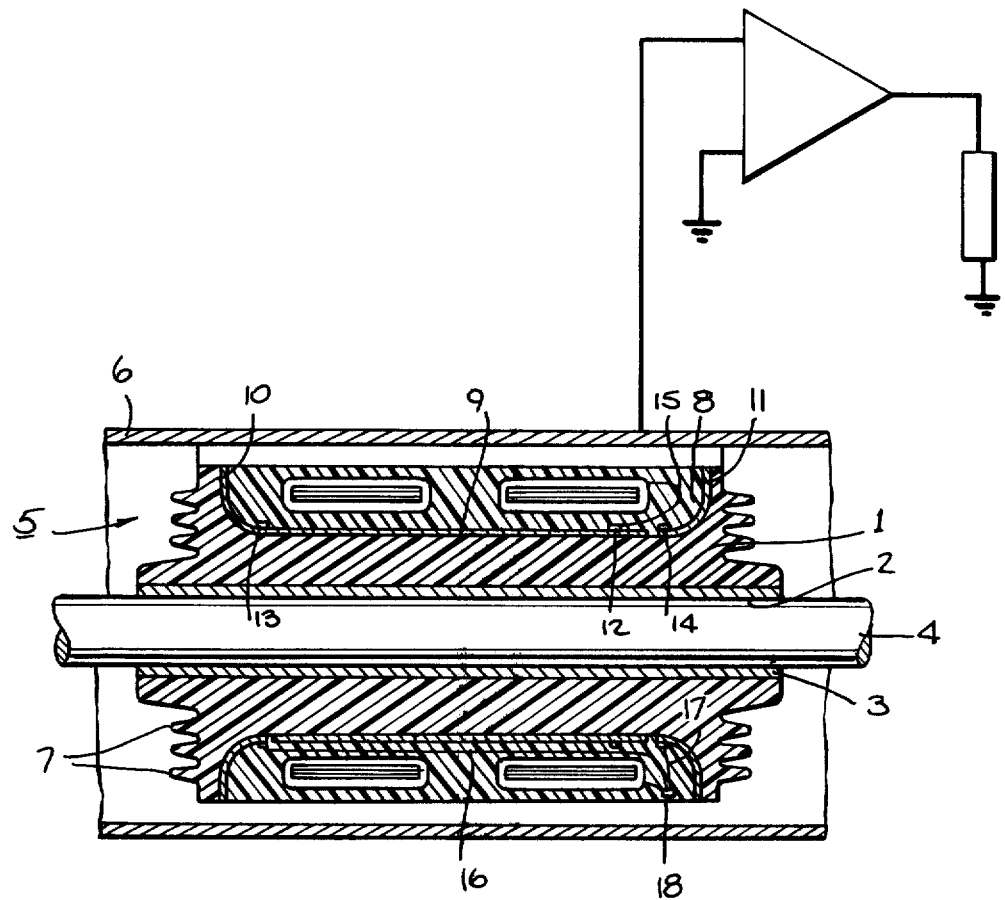

VOLTAGE TRANSFORMER FOR COMPLETELY INSULATED, METAL-CLAD HIGH-VOLTAGE INSTALLATIONS

BACKGROUND OF THE INVENTION

The invention relates to a voltage transformer for completely insulated, metal-clad, high-voltage installations equipped with a metal outer tube. An electrode of extended surface area is arranged inside the metal outer tube and, together with the high-voltage conductor of the installation, forms the high-potential capacitor of a voltage divider. The voltage divider includes a low-potential capacitor connected with the high-potential capacitor. An amplifier is connected to the low-potential capacitor and is followed by a load.

Deutsche Offenlegungsschrift 2,125,297 discloses a voltage transformer of this general type; however, the low-potential capacitor thereof is arranged as a separate structural unit outside the high-voltage installation, for example, at the outer tube of the high-voltage switching installation.

SUMMARY OF THE INVENTION

It is an object of the invention to provide a voltage transformer for metal-clad, high-voltage installations which requires very little space and can be manufactured at relatively low cost.

According to a feature of the voltage transformer according to the invention, the dielectric of the high-potential capacitor is formed by an insulating member which carries the electrode of extended surface area and which also carries the low-potential capacitor.

The advantage of the voltage transformer according to the invention is that not only the high-potential capacitor, but also the low-potential capacitor of the capacitive voltage divider is arranged inside the outer tube of the high-voltage installation, so that on the one hand, additional fastening means for the low-potential capacitor at the high-voltage switching installation are avoided and, on the other hand, the space required by the high-voltage installation is reduced because the low-potential capacitor is located not outside the high-voltage installation, but rather, inside the outer tube of the installation.

A further advantage of the voltage transformer according to the invention is seen in the fact that because of the physically close proximity between the high-potential capacitor and the low-potential capacitor, both capacitors are subjected to approximately the same temperature changes and therefore, a corresponding percentage of capacity change takes place in both capacitors in the event of temperature changes, if the dielectrics of the high-potential capacitor and the low-potential capacitor are chosen advantageously with respect to the temperature characteristic, so that for practical purposes the division ratio of the capacitive voltage divider consisting of the high-potential and the low-potential capacitors does not change at all. This has a favorable effect on the transformation ratio of the voltage transformer according to the invention.

It is particularly advantageous if the material of which the insulating member is made serves as the dielectric of the low-potential capacitor. In such an embodiment of the voltage transformer according to the invention, it is assured that the dielectrics of both capacitors show the same temperature behavior and, due to their physically close proximity, are subjected to the same temperature changes, so that a change of the division ratio of the capacitive voltage divider is very largely precluded in the event of temperature changes. The transformation accuracy of the voltage transformer according to the invention is then very high over a large temperature range.

For manufacturing reasons, it is considered advantageous if the insulating member consists of cast resin because this cast resin is also highly suited for the low-potential capacitor; the inserts constituted by the large-area electrode and the low-potential capacitor can, for instance, be joined together by a common casting operation which also forms the insulating member.

It is, however, considered as particularly advantageous, primarily for manufacturing reasons, if the insulating member is drawn in at its outer periphery and supports the extended surface-area electrode in the drawn-in region. The extended-area electrode can then be arranged favorably in this drawn-in region so as to be in spaced relation to the high-voltage conductor with the insulating body forming the insulation therebetween; the electrode is furthermore located advantageously with respect to the grounded outer tube.

The drawn-in region of the insulating member is also particularly advantageous with respect to the disposition of the low-potential capacitor of the capacitive voltage divider. If the low-potential capacitor is arranged in the drawn-in region, the space which is required for the high-voltage installation and which is determined by the outer tube is not increased, and also the dimensions of the insulating member are not increased.

A circularly wound capacitor is advantageously used as the low-potential capacitor and may contain cast resin as the dielectric.

If it is desired to measure current in addition to voltage, it is advantageous to dispose a current transformer core with a secondary winding system mounted on it in the drawn-in region of the insulating member. The current transformer core with the secondary winding system mounted on it can be located in the drawn-in region in addition to the low-potential capacitor; it can advantageously be arranged next to the low-potential capacitor.

For construction and manufacturing reasons, the drawn-in region of the insulating member is advantageously filled with cast resin; an insulating member cast in two steps is then used in the voltage transformer according to the invention.

Although the invention is illustrated and described herein as a voltage transformer for completely insulated, metal-clad, high-voltage installations, it is nevertheless not intended to be limited to the details shown, since various modifications may be made therein within the scope and the range of the claims. The invention, however, together with additional objects and advantages will be best understood from the following description and in connection with the accompanying drawing.

BRIEF DESCRIPTION OF THE DRAWING

The drawing is a schematic diagram, partially in section, of the voltage transformer according to the invention arranged in the metal enclosure of a high-voltage installation such as a switching installation or the like.

DESCRIPTION OF THE PREFERRED EMBODIMENTS OF THE INVENTION

The voltage transformer includes an insulating member 1 made of cast resin for example. The insulating member 1 is provided, in the region of an inner feed-through passage 2, with a metallic tube 3 which constitutes the "lost" part of a casting mold. The insulating member 1 is pushed with the metallic tube 3 onto a high-voltage conductor 4 of a high-voltage installation 5 which is equipped with a metal outer tube 6.

To lengthen the leakage path, the insulating member 1 is provided with ribs 7 which extend in the form of rings around the high-voltage conductor 4 at the end faces of the insulating member 1. At its outer periphery, the insulating member 1 is drawn-in to define a drawn-in region 8. In the region 8, an extended-area electrode 9 in the form of a conducting coating is applied to the insulating member 1. The electrode 9 has the shape of a cylinder electrode and on both sides thereof there are guard ring-electrodes 10 and 11 which are also formed by conducting coatings. The guard ring-electrodes 10 and 11 are applied so as to be insulated from the extended-area electrode 9. The extended-area electrode 9 as well as the guard ring-electrodes 10 and 11 are provided with a contact ring 12 and further contact rings 13 and 14. Leads 15, 16 and 17 are connected by means of the contact rings 12, 13 and 14 to the electrodes 9, 10 and 11, respectively. The guard ring-electrodes 10 and 11 are grounded through the leads 16 and 17 by connecting the latter to a terminal point 18 which is metallically connected to the outer tube 6 of the high-voltage installation 5.

The extended area-electrode 9 is connected by the lead 15 with a low-potential capacitor 19 located in the drawn-in region 8. The other terminal lead of the capacitor 19 is grounded through the terminal point 18. The high-potential capacitor defined by the high-voltage conductor 4 and the extended-area electrode 9 and the low-potential capacitor 19 therefore conjointly define a capacitive voltage divider. An amplifier is arranged outside the outer tube 6 and is further connected to the capacitive divider through the lead 15.

As may be seen from the drawing, the drawn-in region 8 is filled-in with cast resin so that a compact insulating member is formed which carries the low-potential capacitor and the extended-area electrode required for forming the high-potential capacitor of the capacitive voltage divider.

The invention provides a voltage transformer for completely insulated, metal-clad, high-voltage installations such as switching installations and the like which is both cost-effective and requires little space.

What is claimed is:

1. A voltage transformer for a fully-insulated, metal-encapsulated, high-voltage installation such as a switching installation or the like having a metal outer tube containing a high-voltage conductor therein comprising: an extended-surface area electrode disposed in spaced relation to the high-voltage conductor; an insulating body for carrying said electrode in spaced relation to the high-voltage conductor, said electrode and the high-voltage conductor conjointly defining a high-voltage capacitor, said insulating body constituting the dielectric of said high-voltage capacitor; and, a low-voltage capacitor also being arranged on said insulating body so as to be carried thereby and being connected to said high-voltage capacitor, said high-voltage capacitor and said low-voltage capacitor conjointly defining a voltage divider.

2. The voltage transformer of claim 1 comprising an amplifier connected across said low-voltage capacitor, and a load connected to the output of said amplifier.

3. The voltage transformer of claim 1, said low-voltage capacitor having a dielectric made of the same material of which said insulating body is made.

4. The voltage transformer of claim 3, said insulating body being made of cast resin.

5. The voltage transformer of claim 1, said insulating body having an outer periphery facing away from the high-voltage conductor, said outer periphery being drawn in to define a region for accommodating said extended-surface electrode.

6. The voltage transformer of claim 5, said low-voltage capacitor also being accommodated in said region.

7. The voltage transformer of claim 6, said low-voltage capacitor being a circularly wound capacitor.

8. The voltage transformer of claim 5 supplemented with a current transformer to form a composite voltage and current transformer comprising a current transformer unit likewise mounted in said region of said insulating body, said current transformer unit comprising a current transformer core, and a secondary winding system mounted on said core.

9. The voltage transformer of claim 6, said insulating body being made of casting resin.

10. The voltage transformer of claim 9, said region being filled out with casting resin.

* * * * *